(12) United States Patent
Chefalas et al.

(10) Patent No.: US 6,785,834 B2
(45) Date of Patent: Aug. 31, 2004

(54) METHOD AND SYSTEM FOR AUTOMATING PRODUCT SUPPORT

(75) Inventors: Thomas E. Chefalas, Somers, NY (US); Ajay Mohindra, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 558 days.

(21) Appl. No.: 09/814,287

(22) Filed: Mar. 21, 2001

(65) Prior Publication Data

US 2002/0138786 A1 Sep. 26, 2002

(51) Int. Cl.$^7$ .............................................. G06F 11/00
(52) U.S. Cl. ............................................. 714/4; 714/25
(58) Field of Search ....................................... 714/4, 25

(56) References Cited

U.S. PATENT DOCUMENTS

| | | | |
|---|---|---|---|
| 5,367,667 A | 11/1994 | Wahlquist et al. | 714/32 |
| 5,732,268 A | 3/1998 | Bizzarri | 713/2 |
| 6,119,247 A | 9/2000 | House et al. | 714/38 |
| 6,151,601 A | 11/2000 | Papierniak et al. | 707/10 |
| 6,205,579 B1 | 3/2001 | Southgate | 717/173 |
| 6,230,287 B1 | 5/2001 | Pinard et al. | 714/31 |
| 6,338,152 B1 | 1/2002 | Fera et al. | 714/48 |
| 6,542,898 B1 | 4/2003 | Sullivan et al. | 707/102 |
| 6,560,726 B1 | 5/2003 | Vrhel et al. | 714/55 |
| 6,601,190 B1 | 7/2003 | Meyer et al. | 714/37 |
| 6,615,240 B1 | 9/2003 | Sullivan et al. | 709/205 |
| 2001/0034712 A1 | 10/2001 | Colvin | 705/52 |
| 2003/0139975 A1 | 7/2003 | Perkowski | 705/26 |

*Primary Examiner*—Robert Beausoliel
*Assistant Examiner*—Bryce P. Bonzo
(74) *Attorney, Agent, or Firm*—Scully, Scott, Murphy & Presser; Thu Ann Dang, Esq.

(57) ABSTRACT

According to the teachings of the present invention there are provided a system and method for automatically supporting one or more registered products at a computing device, the computing device being enabled to communicate via a communication network to a support web server, the method comprising: downloading to the computing device a software agent; diagnosing malfunctions of the one or more products at the computing device and transmitting the malfunctions to said web server; communicating from the support web server to the software agent one or more solutions in response to receiving the malfunctions; and installing at least one of the one or more solutions thus transmitted at the computing device.

4 Claims, 6 Drawing Sheets

```
      WELCOME TO ACME INC WEBSITE               700a
  702           706   708
         704-PURCHASE ORDER
  Part number  Unit Cost   QTY   Total 1x980        $30/-      [1]   30.00
                     Total       30.00
710— Name            [Wily Coyote]
712— Credit Card No. [1234 5678 9878 4321]
714— Exp date        [10/1900]

Please complete the shipping information
   on the next page

[NEXT]  —716   718—  [CANCEL]
```

FIG. 7B

```
      WELCOME TO ACME INC WEBSITE               700b
              PURCHASE ORDER
        Shipping Information  —720
722— Name     [Wily Coyote]
724— Address  [1 ACME ROAD
               FOREST HILLS, XC 00000]
726— Tel      [(999)-555-4021]

Please check the box below for electronic
   delivery (if available)  [X] —728

[OK]  —730   718—  [CANCEL]
```

FIG. 8

| Date —802 | Source —804 | Status —806 |
|---|---|---|
| 3/5/2001 | RemoteAccess | 9980 |
| 3/5/2001 | WinMgmt | 37 |
| 3/5/2001 | Printer | 23 |

808 { (bracket for rows)   800

METHOD AND SYSTEM FOR AUTOMATING PRODUCT SUPPORT

CROSS-REFERENCE TO RELATED APPLICATIONS

This application is related to co-pending U.S. patent application Ser. No. 09/802,248, which is entitled "METHOD AND SYSTEM FOR AUTOMATING PRODUCT REGISTRATION", filed on Mar. 8, 2001, and incorporated herein by reference in its entirety.

TECHNICAL BACKGROUND OF THE INVENTION

1. Field of the Invention

The present invention relates generally to product support, and more particularly to a method and system for automating product support of registered products via a communication network.

2. Description of the Prior Art

Generally, product support, also called technical support, is a process by which a manufacturer (or a third-party service company) provides support or assistance to a customer for a product purchased from and registered with the manufacturer. Generally, registering a product commences a warranty period for the product during which the customer is entitled to receive technical support. Presently, customer or technical support varies widely. If a manufacturer provides good customer support, the manufacturer achieves and retains customer loyalty, and keeps track of any defects or problems that arise with respect to its products. Conversely, if the manufacturer provides poor quality customer support or no support at all, then customers switch to a competitor's product, and as a result the manufacturer looses customer loyalty and most importantly business. Presently, a manufacturer may provide the following typical customer support options: 1) mail-in service—the manufacturer will repair customer's product if the customer mails it in to the manufacturer; 2) carry-in service—the manufacturer will repair customer's product if the customer delivers it to a local manufacturer's service site or a third-party site (e.g., sometimes called depot service); 3) on-site contract—for a monthly or annual fee for a fixed number of hours, a repair person from a manufacturer or a third-party will visit a customer's site to fix the product or other problems reported (e.g., the fee is sometimes included in a purchase price of the product); 4) customer helpdesk—a software manufacturer often provides a toll-free phone number that a customer may call to speak with a customer service representative for advice and trouble-shooting of the product; 5) bulletin board system—a manufacturer also may maintain an electronic bulletin board (e.g., forum within online services) staffed by service engineers, to which a customer via a modem may post a problem and a technician will respond with a solution.

In an effort to mitigate costs associated with the foregoing typical customer support options, manufacturers have begun to offer web-based customer support systems to their customers in hopes that the customers will be able to locate information necessary to find solutions to technical problem with their products. Web-based customer support systems are effective in providing bulk information and fixes to common technical problems. However, web-based customer support systems, as described herein below with reference to FIG. 1, are not very effective or efficient in diagnosing and fixing the technical problems.

Figure 1:
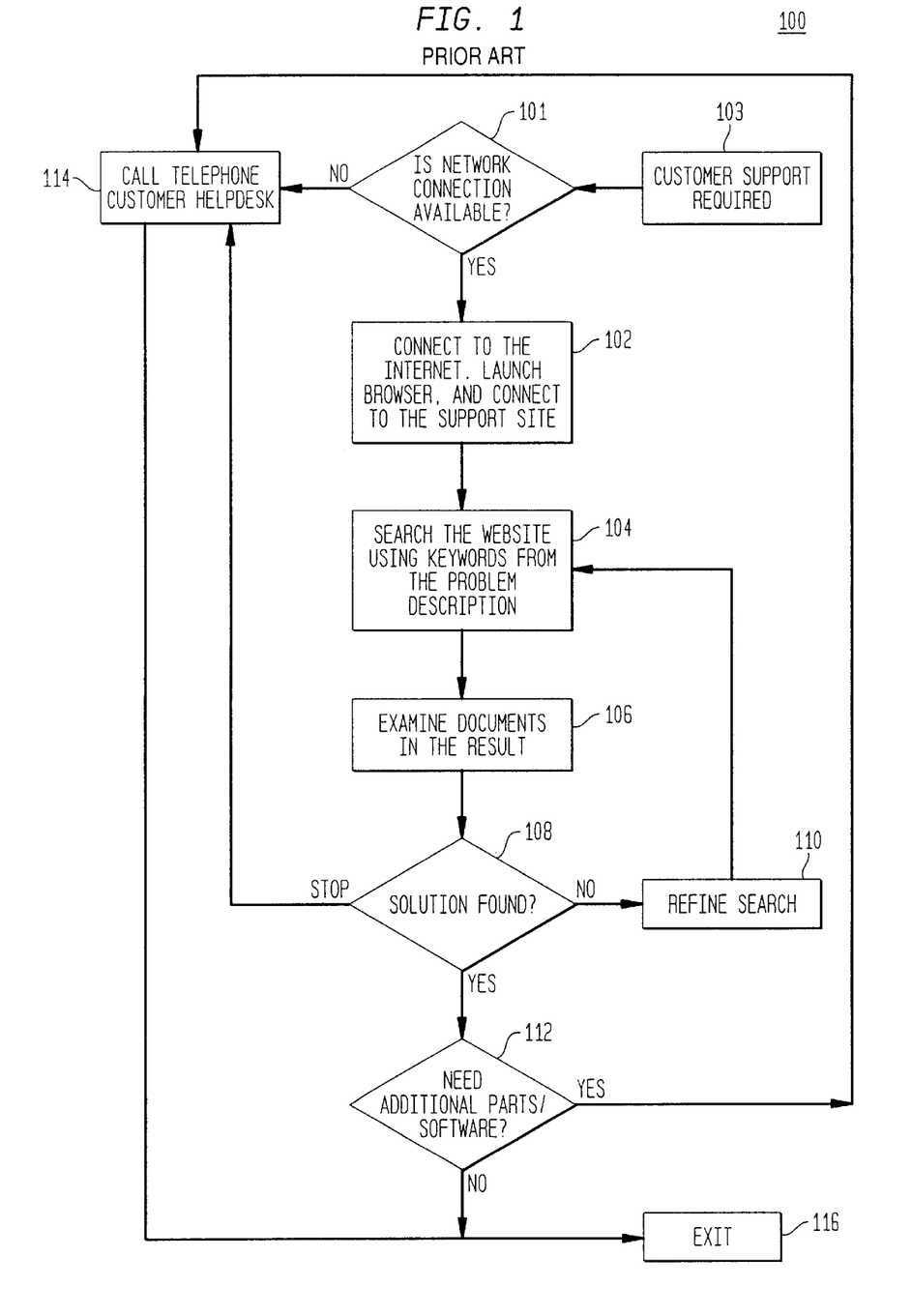
FIG. 1 is an exemplary illustration of a prior art sequence of steps for performing web-based customer support.

FIG. 1 illustrates a prior art sequence of steps 100 for performing web-based customer support. Referring to FIG. 1, at step 103 a customer identifies that customer support is required. Conventionally, this occurs when a computing device fails to operate in an expected manner. At step 101, it is determined whether there is an available network connection. If a network connection is not available, a customer calls a toll-free customer helpdesk at step 114, in a hope that a customer service representative will be able to diagnose a problem and offer a solution. If a network connection is available, the customer launches a conventional web browser and connects to a manufacturer's support website at step 102. At step 104, the customer performs a keyword search corresponding to a problem the customer has encountered. The website retrieves and lists documents corresponding to the keyword search. At step 106, the customer examines the documents in a hope of finding a solution. After the documents are exhausted and a solution is not found at step 108, the customer refines the keyword search corresponding to the problem at step 110 and performs steps 104 through 108 again until a solution is found. If the customer cannot find a solution, the customer may stop and call the toll-free customer help desk at step 114. However, if the customer find a solution at step 108, at step 112 the solution found may inform the customer that additional parts or software are needed to fix the problem, at which point the customer once again contact the toll-free customer help desk at step 114 or exits at step 116. In addition to the foregoing, it should be noted that presently deployed web-based customer support systems, in addition to keyword searches, also offer a customer the ability to browse through the website for more information about products and download published fixes to the products.

An apparent limitation of the prior art sequence of steps for performing web-based customer support is that a customer cannot easily diagnose and solve the customer's problem regarding a product. That is, the functionality provided by the website described hereinabove is limited to helping the customer identify and provide information corresponding to the problem. Furthermore, if a solution is found for the problem, a customer either has to download and apply necessary software fixes (if available), or call the toll-free customer helpdesk for further support with regard to ordering and applying the software fixes and ordering and installing necessary hardware.

Based on the foregoing, it is highly desirable to automate the prior art sequence of steps for performing web-based customer support. It is further highly desirable to eliminate a need for a customer to contact a customer support helpdesk.

SUMMARY OF THE INVENTION

The present invention is directed to a method and system for automating product support of registered products via a communication network.

It is therefore an object of the present invention to eliminate a need for a customer to contact a customer support helpdesk provided by a manufacturer.

It is another object of the present invention to automate the prior art sequence of steps for performing web-based customer support.

Thus according to an embodiment of the present invention, there is provided a method for automatically supporting one or more products at a computing device, the computing device being enabled to communicate via a communication network to a support web server, the method comprising: downloading to the computing device a software agent capable of diagnosing malfunctions of the one or more products; diagnosing the malfunctions of the one or more products at the computing device and transmitting information regarding said malfunctions to the support web server; communicating from the support web server to the software agent information regarding one or more solutions for correcting the malfunctions in response to receiving the information regarding the malfunctions; and implementing at least one of the one or more solutions for correcting the malfunctions.

According to a further embodiment of the present invention, there is provided a system for automatically supporting one or more products, the system comprising: a computing device being enabled to communicate via a communication network, the computing device including said one or more products; a software agent capable of being downloaded to the computing device and enabled to diagnose malfunctions of one or more products at the computing device and to generate information relating to the diagnosed malfunctions; and a support web server being enabled to receive the information relating to the diagnosed malfunctions and to compare the malfunctions for the one or more products received from the software agent with known problems, to determine one or more solutions based upon successful comparisons; and to transmit the one or more solutions to said computing device for correcting the malfunctions.

BRIEF DESCRIPTION OF THE DRAWINGS

The objects, features and advantages of the present invention will become apparent to one skilled in the art, in view of the following detailed description taken in combination with the attached drawings, in which.

DETAILED DESCRIPTION OF THE PREFERRED EMBODIMENT

The present invention is directed to a method and system and for method and system for automating product support of registered products via a communication network. A method and system for automating product registration of purchased products via a communication network is described in related to co-pending U.S. patent application Ser. No. 09/802,248. It should be noted that the present invention is not limited to the registration of purchased products described in the related co-pending application.

Figure 2:
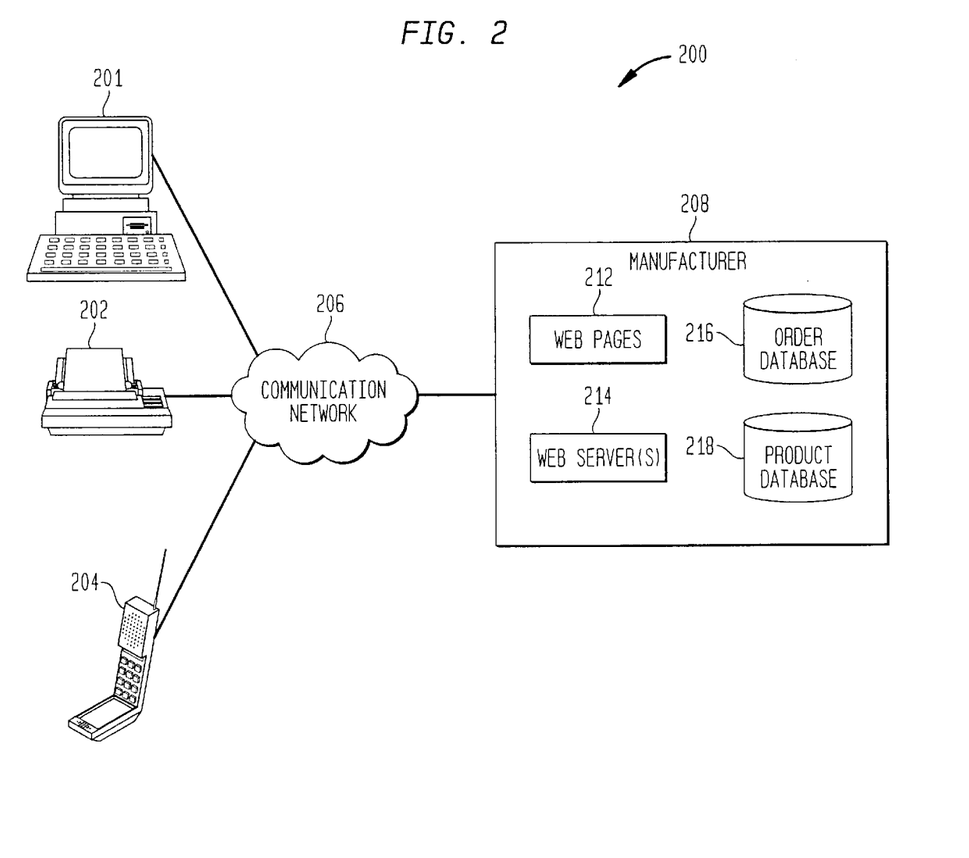
FIG. 2 is an exemplary illustration of system architecture for automatic product support according to the present invention.

FIG. 2 illustrates system architecture 200 for automatic product support according to the present invention. Preferably, the system architecture 200 of FIG. 2 is a client-server based environment, in which a customer uses a browser on any Internet-connected computing device, such as personal computer 201, internet-enabled copier or printer 202, or internet-enabled telephone 204 to connect via communication network 206 to a manufacturer Website (e.g., support location) 208 for receiving automated customer support according to the present invention. Communication network 206 may include a wireless/wired Intranet/Internet communication network. Manufacturer Website 208 includes Web server(s) 214 for processing customer requests for support and generating downloadable web pages 212, generating and transmitting software agents (described hereinafter with regard to FIGS. 3 and 4) and communicating therewith over communication network 206 for diagnosing problems at computing device 201, 202 and 204. Web server(s) 214 is further interconnected with product database 218 that contains a list of one or more products that the manufacturer sells and supports and order database 216 that contains orders for the one or more products. Personal computer 200 may be a laptop or a desktop computer ("PC"), and may include an operating system, such as Windows 95/98™ or higher, Windows N™, or Linux™.

Further referring to FIG. 2, personal computer 201 includes appropriate hardware adapters and/or network adapters for connecting to communication network 206. The hardware adapters may include a conventional modem (e.g., 56 Kbps modem), cable modem, Digital Subscriber Line ("DSL") modem, satellite and wireless receivers and suitable coders/decoders, while the network adapters may include token-ring or Ethernet and the like. Personal computer 201 has appropriate software drivers to utilize communication protocols, such as Transmission Control Protocol/Internet Protocol ("TCP/IP"), NetBios Enhanced User Interface ("NetBEUI"), Internetwork Packet Exchange/Sequenced Packet Exchange ("IPX/SPX"), other wireless/wired communication protocol, and the like for communicating over communication network 206. Personal computer 201 further includes a web browser and a dialer. The web browser may include any conventional web browser, such as Microsoft Internet Explorer™ or Netscape Navigator™, while the dialer may include AT&T's Global Network Dialer™. Other computing devices, such as copier or printer 202 and telephone 204, likewise include appropriate hardware and software for connecting to communication network 206.

Additionally with reference to FIG. 2, Web server(s) 212 may be an IBM Risc System 6000 running AIX™ operating system, or a PC running Windows NT™ operating system. Web server(s) 212 may further include IBM Websphere Application Server™ supporting Enterprise Java Beans™ technology and the like for handling user requests from personal computer 201, printer-copier 202, phone 204, and the like. Sales order database 216 and product database may be IBM DB2™ or an Oracle™ databases.

Figure 3:
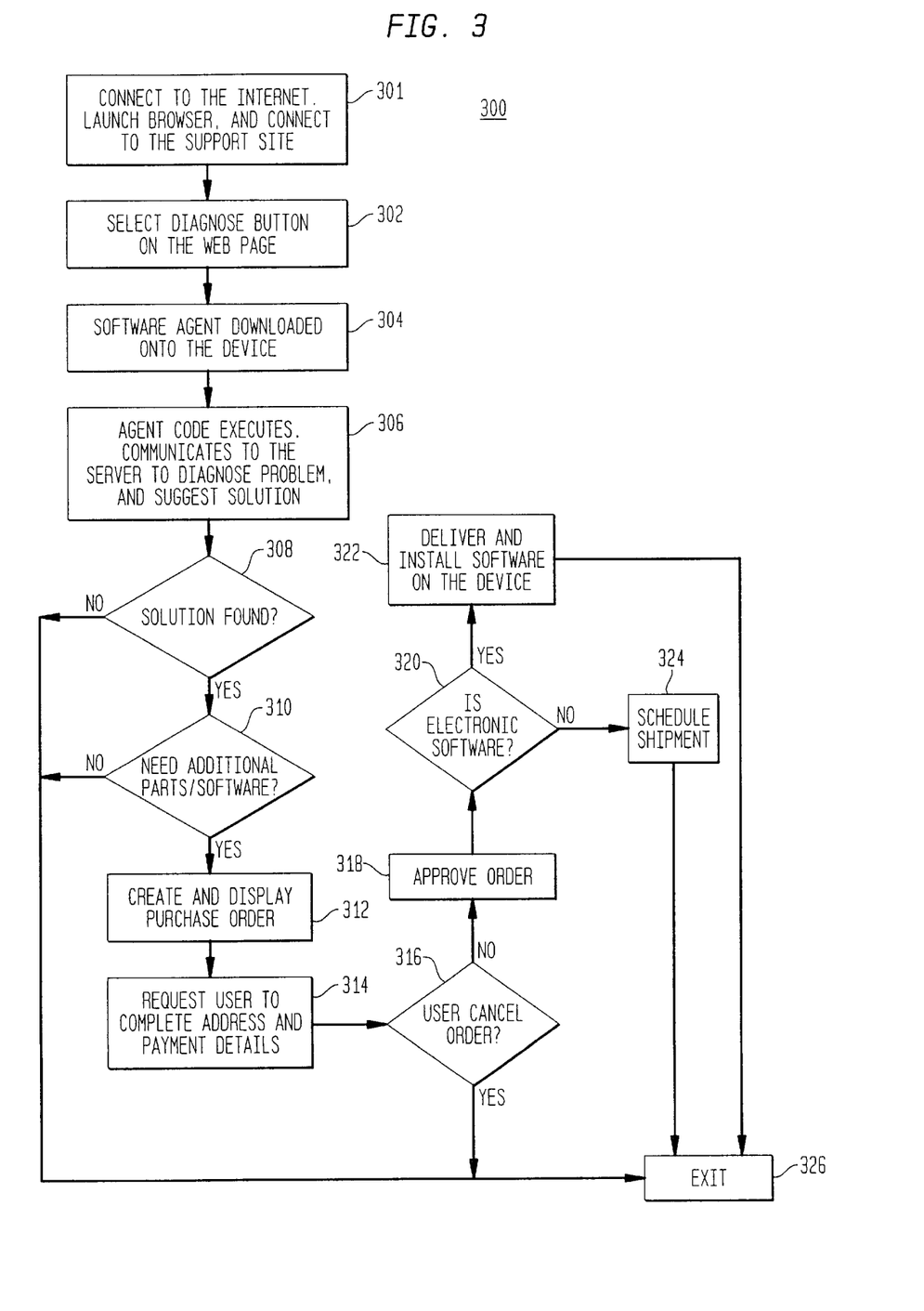
FIG. 3 is an exemplary illustration of a sequence of steps for automating product support according to the present invention.

FIG. 3 illustrates an exemplary sequence of steps 300 for automating product support, i.e., steps that occur when a user desires to obtain support for a registered product, according to the present invention. Although FIG. 3 illustrates an embodiment of the present invention that is directed to automating product support utilizing a personal computer 201 of FIG. 2 that includes a conventional web browser, the exemplary sequence 300 applies to other computing devices that support web browsers or browser-like interfaces, such a printer or copier 202 or phone 204 of FIG. 2. Now referring to FIG. 3, at step 301 the user conventionally connects to the Internet and launches a web browser (e.g., Internet Explorer™, Netscape Navigator™, or the like) and opens a web page represented by a Uniform Resource Locator ("URL") for the manufacturer's Website (e.g., support location) 208 provided by web server(s) 214 of FIG. 2.

Figure 5:
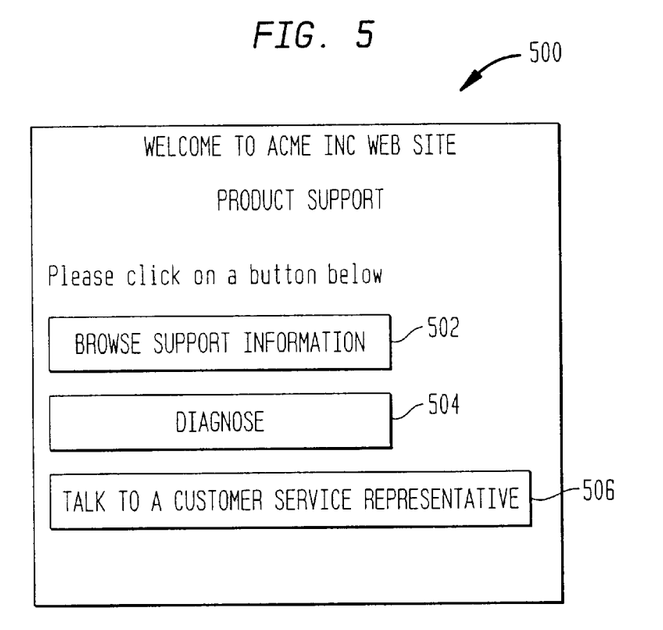
FIG. 5 is an exemplary illustration of web page for performing customer support according to the present invention.

FIG. 5 is an exemplary illustration of web page 500 that may be located at the manufacturer's website 208 for performing customer support according to the present invention. The web page 500 includes button 502, which enables the customer to browse for support information on manufacturer's website 208. Button 504 enables the customer to initiate customer support according to the present invention, while button 506 enables the customer to contact a service representative. It is assumed that the user knows the URL for the manufacturer's Website 208 and can navigate the manufacturer's Website 208 to load appropriate web pages 212, such as web page 500 of FIG. 5, for obtaining product support. Once the user loads web page 500 of FIG. 5 for automatic product support, at step 302 the user selects a "Diagnose" button 504 on web page 500 for diagnosing user's computing device that has failed to operate in an expected manner. At step 304, Web server(s) 214 uploads onto the user's computing device a software agent for diagnosing malfunctions at the computing device.

Now referring back to FIG. 3, the software agent that is downloaded to the user's computing device may be a Java Applet, an ActiveX control, or an agent compiled for a platform specific binary format. Once downloaded, the software agent executes on the user's computing device (e.g., computer 201, printer or copier 202, or phone 204 of FIG. 2). Preferably, the software agent that is downloaded is a Java Applet. One skilled in the art will readily appreciate that an ActiveX control is similar to a Java applet, however, unlike the Java applet the ActiveX control has full access to the Windows™ operating system. Consequently, the ActiveX control has greater access to the underlying software and data on the computing device. However, the ActiveX control currently can only execute on a Windows™ platform (e.g., computing device running Windows™), whereas the Java applet may execute on all platforms that run Java-enabled browsers. Therefore, it is preferable that Web server(s) 214 query the computing device 201, 202, 204 of FIG. 2 regarding the type of agent to be downloaded to the computing device. One skilled in the art that will readily appreciate that the software agent according to the present invention is not limited to an ActiveX control or a Java Applet, but rather any other type of agent may be implemented in accordance with the teachings of the present invention. That is, computing devices 201, 202, and 204 may not support Java Applets or ActiveX controls. Examples, of computing devices that may not support Java Applets or ActiveX controls include cell phone, copiers, fax machines and pagers that are based on custom chip sets. In such cases, the customer may be queried to specify the type of computing device that needs to be diagnosed via conventional methods. Based on such specification, a software agent written in a device dependent binary language is downloaded to the computing device. It should be noted that a principal difference among software agents for different computing devices are the application protocol interfaces ("API") used for diagnosing the problem(s).

Further referring to FIG. 3, at step 306 the software agent executes at the user's computing device 201, 202, 204, communicating to Web server(s) 214 of FIG. 2 and in cooperation therewith diagnosing a problem(s) at the user's computing device, and suggesting a solution(s) to solving the problem(s) (e.g., described herein below in greater detail with reference to FIG. 4). At step 308, if the software agent is unable to diagnose the problem(s) or provide a suggestion (s) for a solution(s), it informs the user that no solution(s) is available and exits at step 326. However, if a problem(s) is diagnosed in step 306 and solution(s) is found at step 308, the software agent informs the user about the problem(s) and offers the possible solution(s), as illustrated in FIG. 6 herein below.

Figure 6:
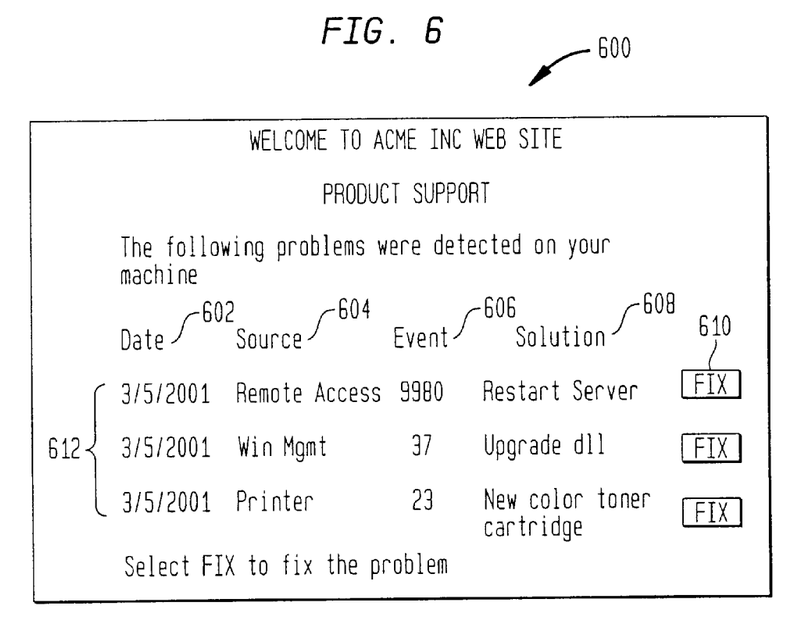
FIG. 6 is an exemplary illustration of a web page for displaying diagnosed problems and solutions according to the present invention.

FIG. 6 is an exemplary illustration of web page 600 for displaying diagnosed problem(s) and possible solution(s) according to the present invention. Web page 600 includes one or more problems 612 that were diagnosed by the software agent on a particular computing device. Each of the diagnosed problems 612 includes a date 602, source 604 and event number 606 of problem, proposed solution 608 and a "fix" button 610 for initiating a proposed solution 608 associated with a source 604 and event number 606 of a detected problem. Open clicking of the "fix" button 610 with a pointing device (i.e., mouse), the software agent implements the proposed solution 608.

Figure 7A:
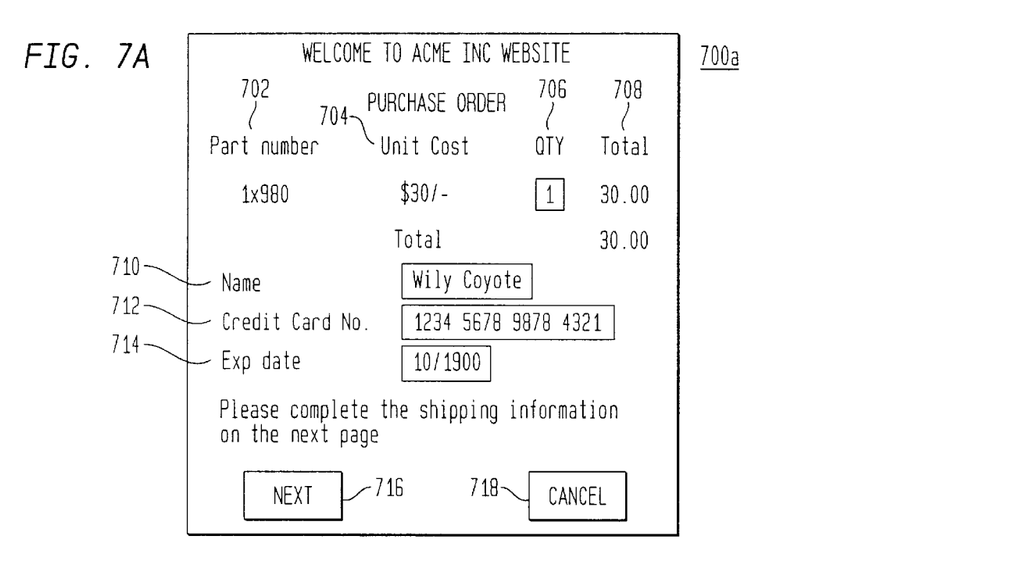
FIGS. 7(a)-(b) are exemplary illustrations of purchase order web pages for a product according to the present invention.
Figure 7B:
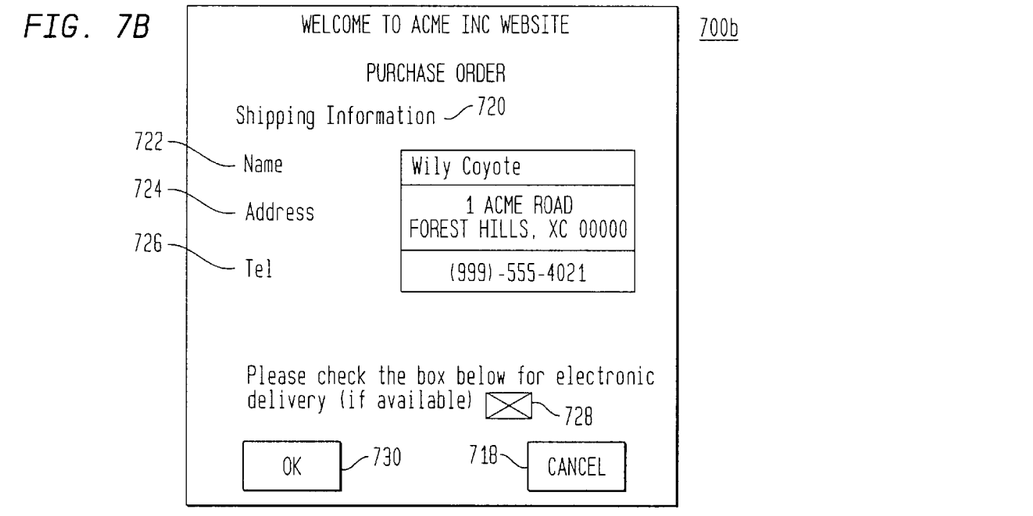

With further reference to FIG. 3, at step 310, if the software agent determines that the solution requires additional hardware parts and/or software, the software agent in cooperation with the web server(s) 214 creates and displays a purchase order as a form to the user at step 312, as illustrated in FIGS. 7(a) and 7(b) described herein below. Preferably, the purchase order is generated even if the part/software is free because it provides a mechanism for the manufacturer to keep track of customers who use the support web site 208 to diagnose and fix problems. Once the purchase order is generated, at step 314 the software agent requests the customer to complete payment information as depicted in web page 700(a) of FIG. 7(a) and name and address information as depicted in web page 700(b) of FIG. 7(b), both of which are provided for in the purchase order. If the user chooses to cancel the purchase order at step 316, the software agent completes execution and exits at step 326.

FIG. 7(a)-(b) are exemplary illustrations of purchase order web pages 700(a) and 700(b) for purchasing a product according to the present invention. In FIG. 7(a), web page 700(a) displays a purchase order for a product including part number 702, unit cost 704, quantity 706 and total price 708. Furthermore, web page 700(a) displays input fields for credit card information necessary to complete the purchase, including name of credit card holder 710, credit card number 712, and expiration date 714. Next button 716 loads web page 700(b) as depicted in FIG. 7(b), while cancel button 718 cancels the purchase order. As aforementioned, the product may be provided free of the charge to the customer, in which case credit card information fields may be grayed out. In FIG. 7(b), web page 700(b) displays and input fields for shipping information 710, including customer name 722, address 724 and telephone 726 that are necessary to complete the purchase order. Field 728 of the purchase order may query the customer regarding whether the customer wants electronic delivery of the purchased product, if available. OK button 730 completes the purchase order, while the cancel button 718 cancels the purchase order.

Referring back to FIG. 3, after the user submits the completed purchase order form, the software agent in cooperation with the web server(s) 214 approves the purchase order at step 318. During approval, the software agent transmits the information entered by the customer to the web server(s) 214, preferably via Hyper Text Transfer Protocol ("HTTP"), or the like. At step 320 of FIG. 3, the software agent determines if the purchased product can be delivered electronically. That is, if the purchased product is a software product, then it preferable to deliver or upload the software product electronically via communication network 206 to user's computing device 201, 202, 204. This can be accomplished via conventional techniques, such as by using File Transfer Protocol ("FTP"), and the like. Conversely, if the purchased product is a hardware device such as an adapter card, chip or the like, then the product is delivered via conventional mail. For a software product, once the software agent determines that the software product may successfully be downloaded via communication network 206, at step 322 the software agent initiates an upload session (e.g., via FTP) with Web server(s) 214 to deliver or upload the software product, and the software agent subsequently installs the software product on the computing device 201, 202, or 204. To install the product on the computing device 201, 202, or 204, the software agent executes a file image of the product. The format of the file image of the product is a conventional self-executing or self-installing format for the computing device to which it is uploaded. Execution of the downloaded file image results in the software product being installed on the computing device 201, 202 or 204. Further with reference to FIG. 3, once the software product is successfully installed, the software agent exists at step 326. However, if at step 320 the software agent determines that the product is a hardware product or a software product that cannot be delivered electronically via communication network 206 of FIG. 2 (e.g., software product too large for bandwidth), the software agent schedules shipment of the product and notifies the user of necessary information regarding the shipment (not shown), and thereafter the software agent exits at step 326.

Figure 4:
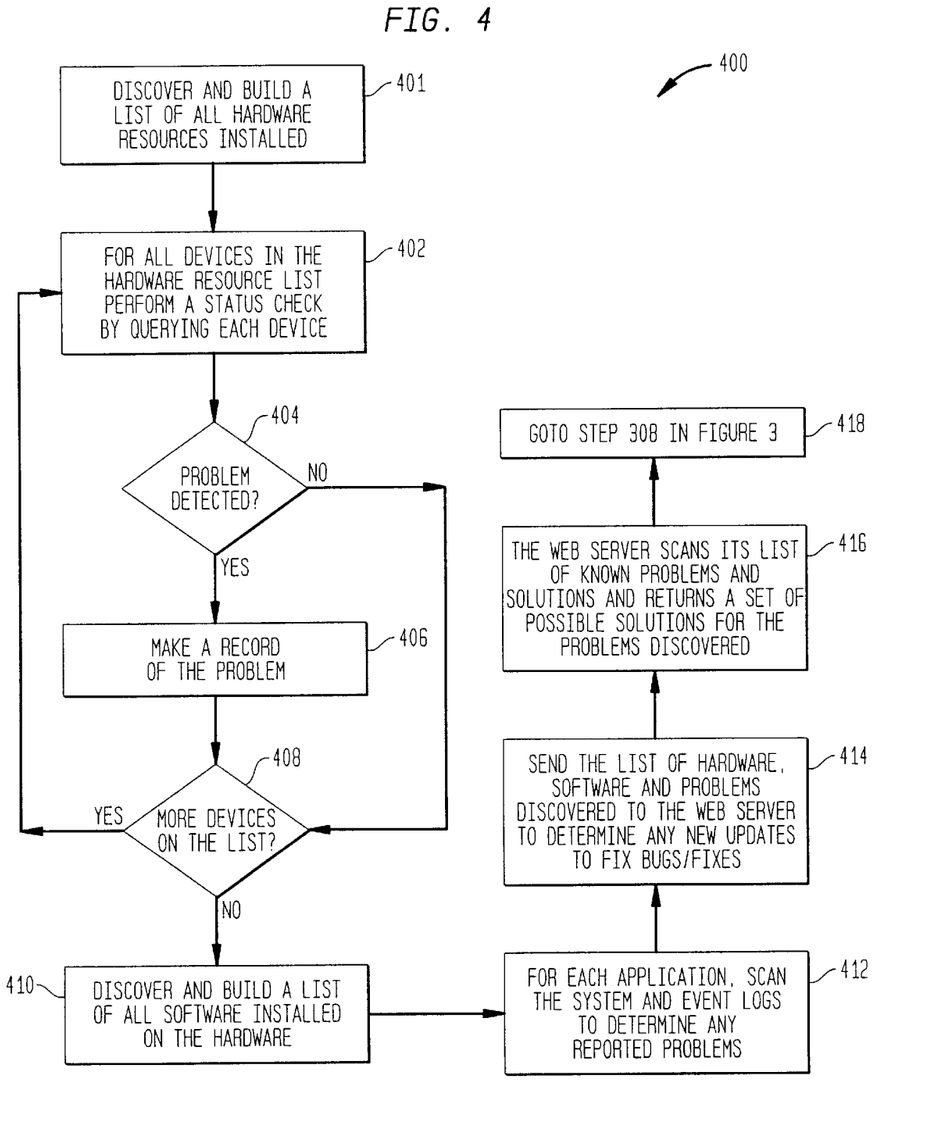
FIG. 4 is an exemplary illustration of a sequence of steps performed by the software agent of FIG. 3 according to the present invention.

FIG. 4 illustrates an exemplary sequence of steps 400 performed by the software agent of FIG. 3. After Web server(s) 214 uploads the software agent at step 306 of FIG. 3 to computing device 201, 202, or 204, the software agent discovers and builds a list of all hardware resources on the computing device at step 401 of FIG. 4. The software agent queries an operating system of the computing device using conventional APIs to discover and build the list of hardware resources on the computing device. For example, under the Windows™ operating system, the software agent utilizes a Windows Management Instrumentation ("WMI") APIs to gather information, while on under AIX UNIX operating system the software agent uses Object Data Manager ("ODM") APIs to gather the information. In the computing device, the hardware resources may include resources on the motherboard, such as a central processing unit ("CPU"), memory and network controllers (e.g., Ethernet controller), cards and adapters attached to the motherboard, such as video and sound adapters, and any other peripheral devices attached to the computer, such as printers, scanners, and the like. In a Windows™ environment, a listing of these resources is generally found in a device manager. At step 402, for each hardware resource on the list, the software agent performs a status check by polling or querying each device regarding its status of operations to determine if the device and associated device drivers are operating properly. If a problem is detected at step 404, the software agent records the problem at step 406 and continues processing other devices on the list at step 402 until the list is exhausted at step 408. Storage of detected problems is preferably internal to the software agent, as particularly illustrated herein below in FIG. 8.

At step 410, after the hardware resources on the list have been polled or queried, the software agent discovers and builds a list of software applications installed on the computing device. As aforementioned with regard to discovery of hardware resource, the software agent utilizes conventional APIs, such as WMI under Windows or ODM under AIX UNIX, to also discover and build the list of software application installed on the computing device. The software applications may include version of the Basic Input/Output System ("BIOS") installed on the computing device 202, 202, or 204 or the like, versions of device drivers installed on the computing device, and may include software productivity applications installed on the computer, such as Microsoft Office™ and Lotus SmartSuite™. Utilizing the list of software applications as a basis, at step 412, the software agent scans event and application logs for the software applications on the computing device 201, 202, 204 or the like, to identify any events that were generated and logged by the software applications in the logs since a last run of the agent. It should be noted that the software stores metadata regarding the last run of the software agent on the computing device. Event and application logs are located in well-known operating system specific folders. For example, <C:\%Windows Install Directory%\system 32\config>under Windows 2000 or Windows NT contains the event and application logs for the Windows systems, while</usr/adrn/messages>under AIX UNIX contains the logs for the AIX UNIX systems. At step 414, the software agent electronically transmits via communication network 206 the generated hardware and software lists along with the recorded problems to Web server(s) 214 for determination of solutions to the problems. At step 416, Web server(s) 214 compares each hardware or software item on the respective lists associated with a respective problem with its database of known problems and solutions, and transmits a set of possible solutions to the software agent. At step 418, software agent continues processing of FIG. 3 at step 308, as described hereinabove with regard to FIG. 3.

Figure 8:
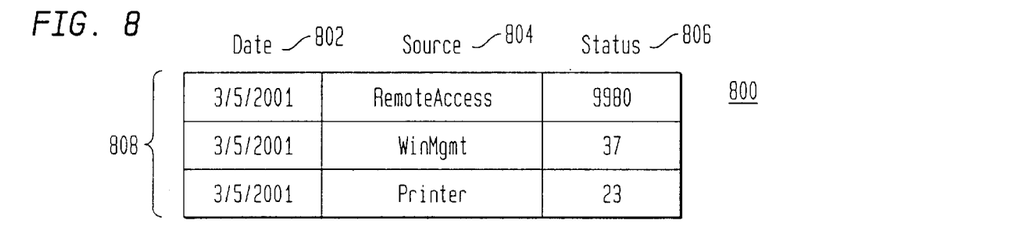
FIG. 8 is an exemplary storage internal to the agent for storing problems diagnosed by the agent during customer support at a computing device according to the present invention.

FIG. 8 is an exemplary storage 800 internal to the agent for storing problems diagnosed by the agent during customer support at a computing device according to the present invention. Storage 800 includes one or more problems 808 that were diagnosed by the software agent on a particular computing device. Each of the diagnosed problems 808 includes a date 802, source 804 and status number 806 of problem. Once diagnosing is completed, the stored problems 808 are transmitted to web server(s) 214 according to the present invention as particularly described with regard to FIG. 4.

While the invention has been particularly shown and described with respect to preferred embodiments thereof, it will be understood by those skilled in the art that the foregoing and other changes in form and details may be made therein without departing from the spirit and scope of the invention as particularly embodied in the appended claims.

Having thus described our invention, what we claim as new, and desire to secure by Letters Patent is:

1. A method for automatically supporting one or more products at a computing device, said computing device being enabled to communicate via a communication network to a support web server, wherein said one or more products include hardware resources at said computing device, said method comprising the steps of:

(a) downloading to said computing device a software agent capable of diagnosing malfunctions of said one or more products;

(b) diagnosing said malfunctions of said one or more products at said computing device and transmitting information regarding said malfunctions to said support web server;

(c) communicating from said support web server to said software agent information regarding one or more solutions for correcting said malfunctions in response to receiving said information regarding said malfunctions;

(d) implementing at least one of said one or more solutions for correcting said malfunctions;

(e) building a list of said hardware resources installed at said computing device;

(f) querying each hardware resource in said list for obtaining operational status of each said hardware device; and (g) storing an operational status for each said hardware device within the list.

2. A method for automatically supporting one or more products at a computing device, said computing device being enabled to communicate via a communication network to a support web server, wherein said one or more products include software applications at said computing device, said method comprising the steps of:

(a) downloading to said computing device a software agent capable of diagnosing malfunctions of said one or more products;

(b) diagnosing said malfunctions of said one or more products at said computing device and transmitting information regarding said malfunctions to said support web server;

(c) communicating from said support web server to said software agent information regarding one or more solutions for correcting said malfunctions in response to receiving said information regarding said malfunctions;

(d) implementing at least one of said one or more solutions for correcting said malfunctions;

(e) building a list of said one or more software applications installed at said computing device;

(f) scanning event and log files associated with each of said one or more software applications in said list for obtaining an operational status of each said one or more software applications; and (g) storing said operational status for each said software application within the list.

3. A system for automatically supporting one or more products, said system comprising:

(a) a computing device being enabled to communicate via a communication network, said computing device including said one or more products;

(b) a software agent capable of being downloaded to the computing device and enabled to diagnose malfunctions of one or more products at said computing device and to generate information relating to the diagnosed malfunctions; wherein said software agent further comprises:

(i) a means for building a list of said hardware resources installed at said computing device;

(ii) a means for querying each hardware resource in said list for obtaining an operational status thereof; and (iii) a means for storing said operational status for each said hardware device within the list; and (c) a support web server being enabled to receive said information relating to said diagnosed malfunctions and to compare said malfunctions for said one or more products received from said software agent with known problems, to determine one or more solutions based upon successful comparisons: and to transmit said one or more solutions to said computing device for correcting said malfunctions.

4. A system for automatically supporting one or more products, said system comprising:

(a) a computing device being enabled to communicate via a communication network, said computing device including said one or more products;

(b) a software agent capable of being downloaded to the computing device and enabled to diagnose malfunctions of one or more products at said computing device and to generate information relating to the diagnosed malfunctions, wherein said software agent further comprises:

(i) a means for building a list of said one or more software applications installed at said computing device;

(ii) a means for scanning event and log files associated with each of said one or more software applications in said list for obtaining an operational status of each said one or more software applications; and (iii) a means for storing said operational status for each said software application within the list; and (c) a support web server being enabled to receive said information relating to said diagnosed malfunctions and to compare said malfunctions for said one or more products received from said software agent with known problems, to determine one or more solutions based upon successful comparisons; and to transmit said one or more solutions to said computing device for correcting said malfunctions.

* * * * *